(No Model.)
C. D. LEWIS.
EGG CARRIER.
No. 267,233. Patented Nov. 7, 1882.
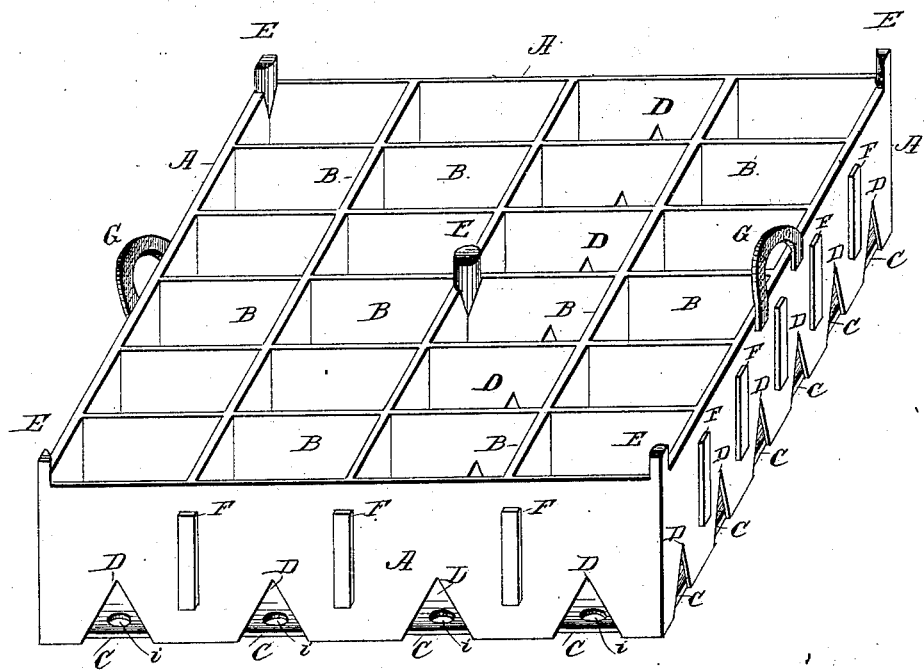
WITNESSES:
H. B. Brown
W. X. Stevens.
INVENTOR:
Chas. D. Lewis
BY
ATTORNEYS.

UNITED STATES PATENT OFFICE.

CHARLES D. LEWIS, OF GEORGETOWN, COLORADO.

EGG-CARRIER.

SPECIFICATION forming part of Letters Patent No. 267,233, dated November 7, 1882.

Application filed August 16, 1882. (No model.)

*To all whom it may concern:*

Be it known that I, CHARLES D. LEWIS, a citizen of the United States, residing in Georgetown, in the county of Clear Creek and State of Colorado, have invented a new and useful Improvement in Egg-Carriers, of which the following is a specification.

My invention relates to improvements in egg-carriers used for the purpose of transportation; and it has for its object to separate the eggs from contact with each other, and from any hard substance which would be likely to break them, and to pack them in cases containing even dozens in such a manner that the absence of an egg will be the only thing to be looked for in counting, and a note of the number of cases is readily translated into dozens by use of the proper multiplier.

Formerly eggs have been packed in bran, sawdust, and such like soft but not very elastic material, placed in barrels and boxes; but this soft material was very liable to work from between the eggs, leaving them to bump against one another, and be broken in the rough usage consequent to long journeys. Again, they have been packed for transportation in boxes having pasteboard partitions forming an individual stall for each egg; but these partitions were not secured together, so as to make each egg-stall unchangeable in form, and any severe sidewise shake was liable to shut these stalls together diagonally, the looseness of the partitions permitting many eggs to be broken. Another cause of breakage in such packing-cases is the nature of the partition material. Pasteboard has very little elasticity relative to pressure on its face, and when unsupported, so that it may move, no great shock is required to break an egg sidewise against it.

To obviate these objections my invention consists in an elastic packing-case provided with a stall for each egg, rigidly secured at its corners and to the bottom, forming one piece throughout, as will be hereinafter fully described and set forth, reference being had to the accompanying drawing, which is a perspective view of my invention.

A A represent the sides; B B, the partitions, far enough apart to receive one egg standing on end in each stall, and C the bottom, all molded of elastic rubber to form one piece, the crossings of the partitions being solidly joined. The partitions are of sufficient thickness to form an elastic cushion between the eggs, and the bottom is sufficiently rigid to maintain its general plane, it being everywhere joined to the partitions. The sides and partitions are formed with holes D and the bottom with holes *i* for ventilation and to lighten the carrier.

The center and corners of the carrier are supplied with extended vertical posts E to serve as buffers or cushions on which succeeding carriers may rest in packing one above another.

F F are side buffers projecting from the carrier at the end of each partition to prevent the side against the eggs striking the packing-box, and in case several carriers are packed on the same level in one box these buffers, being equidistant in all carriers, will rest against each other, thus receiving all lateral jar upon the ends of the partitions, and protecting the sides of the carrier opposite the egg-stalls.

G G represent pliable handles, as of cords or cloth, something that will not be injured or endanger the contiguous eggs when mashed down by an upper carrier.

I am aware that there are egg-carriers similar to mine in general form, having their partitions made of pasteboard not rigidly joined at the corners, and I do not claim that as my invention; but

What I claim, and wish to secure by Letters Patent, is—

1. An egg-carrier constructed with a bottom, sides, and partitions formed into one piece of elastic rubber, constituting a series of stalls, each stall being adapted to carry one egg standing on end.

2. The combination, with the bottom C and sides A, of the partitions B, secured to both bottom and sides, forming one piece of elastic rubber, the stalls so formed being rectangular, and of a size to admit but one egg standing on end in each stall.

3. An egg-carrier consisting of a bottom, sides, and partitions forming one piece of elastic rubber containing many stalls suited to carry one egg in each, having holes through the bottom, sides, and partitions for ventilation, as described.

CHARLES D. LEWIS.

Witnesses:
    E. R. SURPRENANT,
    J. M. PARONTO.